United States Patent

Bouricius et al.

[15] 3,665,418

[45] May 23, 1972

[54] STATUS SWITCHING IN AN AUTOMATICALLY REPAIRED COMPUTER

[72] Inventors: Willard Gail Bouricius, Katonah, N.Y.; William Caswell Carter, Ridgefield, Conn.; John Paul Roth, Ossining; Peter Robert Schneider, Peekskill, both of N.Y.

[73] Assignee: International Business Machines Corporation, Armonk, N.Y.

[22] Filed: July 15, 1968

[21] Appl. No.: 744,888

[52] U.S. Cl. ..............340/172.5, 340/146.1 BE, 340/147 SC

[51] Int. Cl. ....................................G06f 11/00, G06f 11/08

[58] Field of Search ..................340/146.3 J, 146.3 K, 172.5, 340/147 SC, 146.1 BE

[56] References Cited

UNITED STATES PATENTS

| | | | |
|---|---|---|---|
| 3,348,197 | 10/1967 | Akers, Jr. et al | 340/172.5 |
| 3,356,837 | 12/1967 | Raymond | 340/172.5 |
| 3,409,877 | 11/1968 | Alterman et al. | 340/172.5 |
| 3,517,171 | 6/1970 | Avizienis | 340/172.5 |

*Primary Examiner*—Benjamin A. Borchelt
*Assistant Examiner*—H. A. Birmiel
*Attorney*—Lawrence E. Laubscher

[57] ABSTRACT

Status switching means for an automatically repaired computer system of the stand-by redundancy type adapted to replace a failed component by a stand-by spare, characterized in that the switching means include separate selection or switch means associated with each data receiving device, respectively, so that there is no sharing of a given selection means between different receiving devices, whereby no selection means constitutes a "hard core" component the failure of which would interrupt computer operation. By the operation of encoded control means, a reconfiguration of the switching system is effected to shift around a faulty component.

14 Claims, 7 Drawing Figures

Inventors
Willard Gail Bouricius
William Caswell Carter
John Paul Roth
Peter Robert Schneider Lawrence E. Laubscher
Attorney Attorney Inventor
Attorney Attorney Lawrence E. Laubscher
Attorney

[signature]
Attorney

STATUS SWITCHING IN AN AUTOMATICALLY REPAIRED COMPUTER

As suggested by the patents to Brightman, U.S. Pat. No. 2,932,005, Armstrong, U.S. Pat. No. 3,128,449 and Miller et al., U.S. Pat. No. 3,135,946, it has been proposed in the patented prior art to provide switching arrangements for automatically repairing a computer by replacing a failed line or component with an operative one. One drawback to the known systems is that the selection devices are generally "-hard core" components the failure of any one of which would completely deactivate the entire system.

The present invention was developed to provide an improved switching arrangement for an automatically repaired computer wherein the above and other drawbacks of the prior systems are avoided through the use of separate switching or selection means associated with each of the data receiving devices or outputs, respectively, whereby the faults are isolated from other receiving devices and spare components may be substituted for the defective ones without causing system degradation.

Accordingly, the primary object of the present invention is to provide a switching arrangement for an automatically repaired computer wherein separate selection means are associated with each of the data receiving devices, respectively, so that fan-out from and sharing of the selection means are avoided. Shift register means operable by conventional diagnostic programs or error code correction techniques serve to so control the selection means that the connections of the information bearing input lines are shifted to spare lines, thereby by-passing the faulty lines or components. By the use of register means having triple modular redundancy, for example, or other error correction means, the status control connections may be such that the register circuit itself will tolerate at least one failure without causing system degradation.

A more specific object of the invention is to provide a switching arrangement in which fan-out to the separate selection devices is permitted, but in which fan-out from the selection devices is positively avoided. In this manner, no sharing of selection devices on the output side of the system is permitted, and consequently no failure of a single selection device will completely deactivate the system.

According to another object of the invention, the switching arrangement is adapted to connect a first number or groups of information bearing input lines with a selected second number or groups of output lines. According to a first embodiment of the invention the system is of the module-to-buss type and the number of output lines exceeds the number of input lines. According to a second embodiment, the system is of the buss-to-module type, and the number of input lines exceeds the number of modules. In accordance with a third embodiment, the system is of the module-to-module type for connecting a selected one of a number of transmitting modules with a plurality of receiving modules. Finally, in accordance with a preferred embodiment of the invention, the system is of the compound module-to-buss type including first register means for selecting one of a plurality of groups of input lines, and second register means for selecting a desired group of output lines in accordance with the conditions of the output lines.

The foregoing and other objects, features and advantages of the invention will be apparent from the following more particular description of preferred embodiments of the invention, as illustrated in the accompanying drawings, in which.

Figure 1:
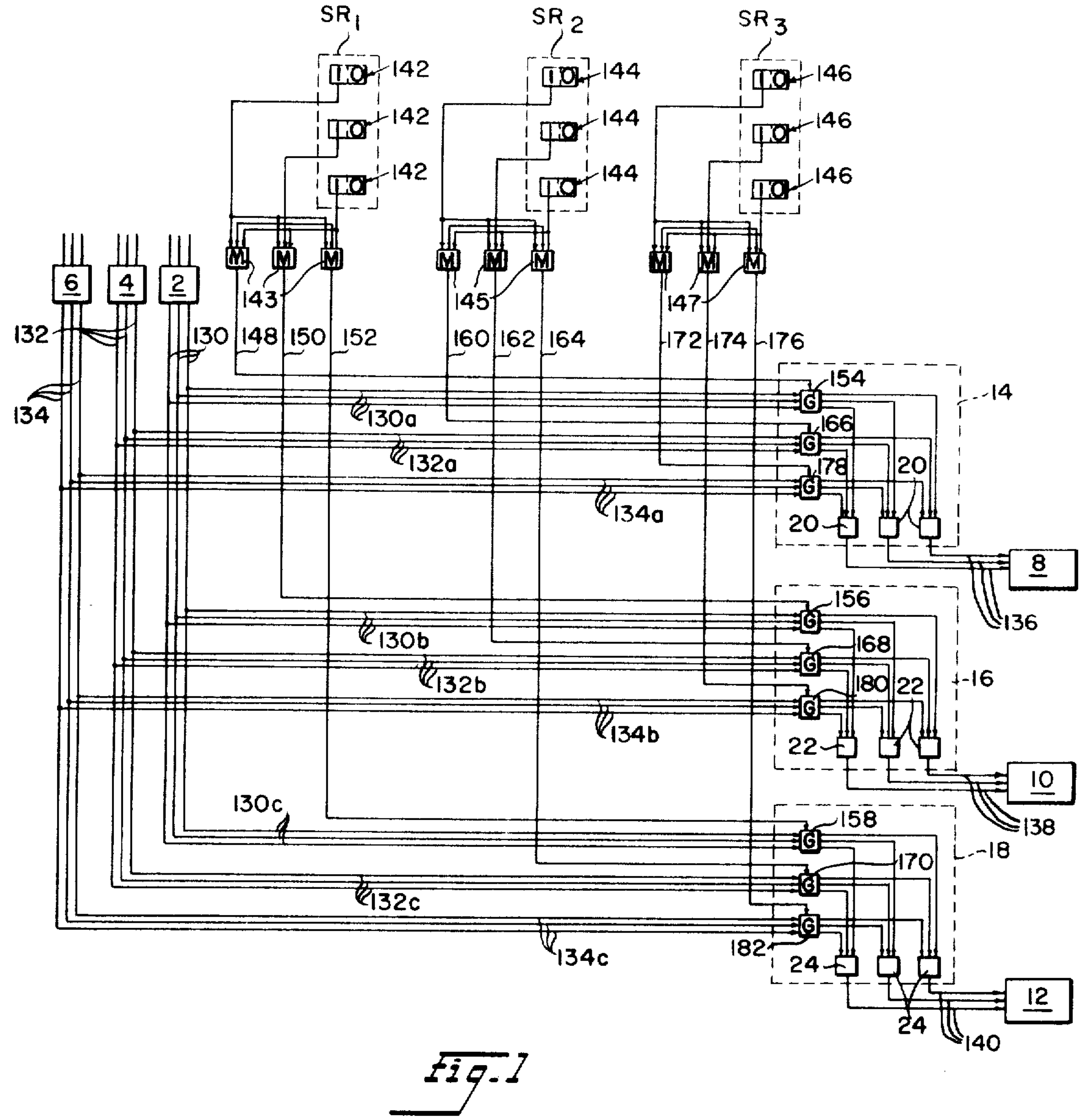
FIG. 1 is an electrical schematic diagram of a switching arrangement of the module-to-module type incorporating the concepts of the present invention.

Referring first to the module-to-module switching arrangement of FIG. 1, the system includes a plurality of groups of input lines 130, 132 and 134 eminating from sending modules 2, 4 and 6 respectively, with a selection mechanism for connecting anyone of these to receiving modules 8, 10 and 12 via selection means 14, 16 and 18, and output lines 136, 138 and 140, respectively. More particularly, selection means 14, 16 and 18 include gates 154, 166 and 178, gates 156, 168 and 180, and gates 158, 170 and 182, respectively, for transmitting or blocking the data based on the state of the control line entering the top of each gate and connected with the output lines via corresponding OR gates 20, 22, and 24, respectively.

The gates 154, 156 and 158 are connected with input lines 130 via fan-out branch lines **130*a*, 130*b* and 130*c*, said gates being enabled by register SR via MAJORITY circuits 143 and conductors 148, 150 and 152. The registers may be of the shift register type and are designated SR. Shift register SR is encoded in the triple modular redundancy using flip-flops 142. Similarly, gates 166, 168 and 170 are connected with input fan-out lines 132*a*, 132*b* and 132*c*, said gates being enabled by shift register $SR_2$ having flip flops 144 via MAJORITY circuits 145, and conductors 160, 162 and 164. Finally, the gates 178, 180 and 182 are connected with fan-out branches 134*a*, 134*b* and 134*c*, said gates being enabled by shift register $SR_3$ via MAJORITY circuits 147 and leads 172, 174 and 176**.

It is apparent that in accordance with the present invention, there is no sharing of the selection means with the output lines, since each receiver is provided with its own selection means. Consequently, there are provided no "hard core" switching devices, and no failure of a single switching means will completely disable the entire system. If a switching means fails, at worst only one becomes inoperative, but never all of them. Failure of the receivers are handled at the next interface where they become the data sending or input devices.

In operation, the information existing on one of a group of input lines 130, 132 or 134 may be routed to all groups of output lines in accordance with the three possible states (001, 010 and 100) of the shift register means ($SR_1$, $SR_2$, $SR_3$). It is intended that the three groups of input lines 130, 132 and 134 carry identical information if all three groups of lines are good. If this is the case, the register is set to 100, whereupon lines 148, 150 and 152 are active to enable gates 154, 156 and 158. Thus the information on the group of lines 130 is routed to all three groups 136, 138 and 140. If the group of lines 130 should go bad (as determined by conventional diagnostic program means, error code means, microprogram means or hardware means), the setting on the register would be changed to 010 which would make lines 160, 162 and 164 active to enable gates 166, 168 and 170. In this manner, the information on lines 132 will appear on lines 136, 138 and 140. If both groups of lines 130 and 132 are bad, the register is changed to 001 which brings up lines 172, 174 and 176 to enable gates 178, 180 and 182. In this manner, the information on lines 134 is routed to lines 136, 138 and 140.

Figure 2:
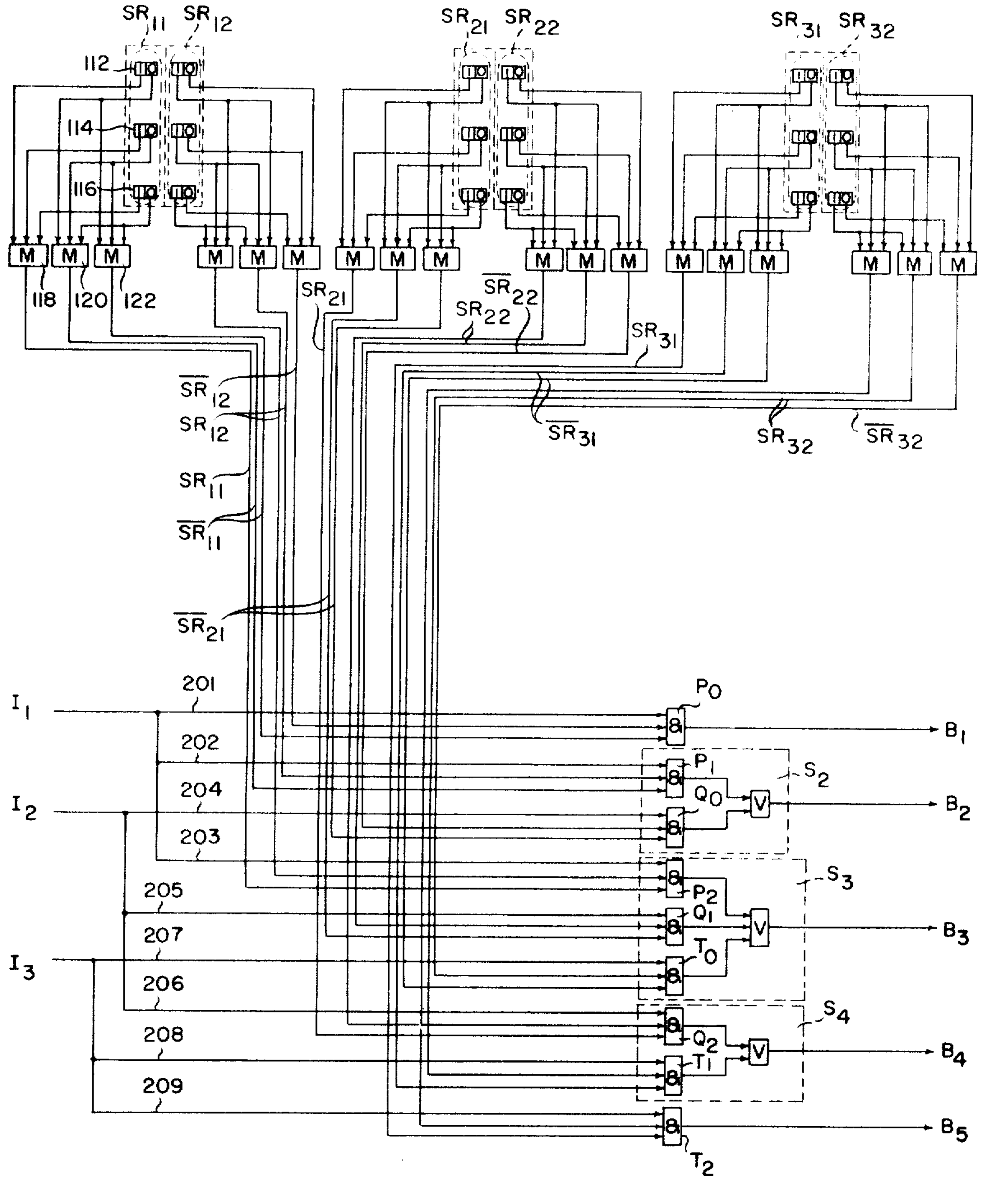
FIG. 2 illustrates another embodiment of the invention wherein the switching arrangement is of the module-to-buss type.

Referring now to the module-to-buss embodiment of FIG. 2, three input lines $I_1$, $I_2$ and $I_3$ are adapted for connection with three of the five output lines $B_1 - B_5$. The switching arrangement includes AND circuits $P_0$, $P_1$, $P_2$, $Q_0$, $Q_1$, $Q_2$, $T_0$, $T_1$ and $T_2$, the AND circuits $P_0$ and $T_2$ comprising the selection means associated with output lines $B_1$ and $B_5$, respectively. The selection means $S_2$ and $S_4$ associated with output lines $B_2$ and $B_4$ comprise tree arrangements in each of which a pair of AND circuits ($P_1$, $Q_0$ and $Q_2$, $T_1$) feed an OR circuit. The selection means $S_3$ of output buss B3 comprises three AND CIRCUITS $P_2$, $Q_1$ and $T_0$ feeding an OR circuit. The input lines $I_1$ includes fan-out connections 201, 202 and 203 leading to AND circuits $P_0$ , $P_1$ and $P_2$. Similarly, input lines $I_2$ and $I_3$ include fan-out connections 204, 205 and 206 and 207, 208 and 209, respectively, feeding AND circuits $Q_0$, $Q_1$, $Q_2$, $T_0$, $T_1$ and $T_2$, respectively.

For enabling the various AND circuits to effect connection between the input lines and selected one of the output lines, diagnostic program controlled status register means $SR_{11}$, $SR_{12}$, $SR_{22}$, $SR_{31}$ and $SR_{32}$ are provided, said registers being of the triple modular redundancy type including flip-flops the outputs of which are connected with the AND gates via MAJORITY circuit means. Referring to the triple modular redundancy (TMR) status register $SR_{11}$, the "1" outputs of flip flops 112, 114 and 116 are connected with the input of MAJORITY circuit 118, and the "0" outputs of each of the flip-flops are connected — via suitable fan-out connections — with both of the MAJORITY circuits 120 and 122. By the use of status register means of the triple modular redundancy type, failure tolerance and redundancy are introduced into the status register. Consequently, the outputs of the majority circuits will not be affected if one of the flip-flops of a status register fails.

Registers $SR_{11}$ and $SR_{12}$ control the connection of input line $I_1$ to output lines $B_1$, $B_2$ and $B_3$; registers $SR_{21}$ and $SR_{22}$ control the connection of input line $I_2$ to output lines $B_2$, $B_3$ and $B_4$; and registers $SR_{31}$, and $SR_{32}$ control the connection of input line $I_3$ to output lines $B_3$, $B_4$ and $B_5$. The lines $I_1$, $I_2$ and $I_3$ are connected to B lines as follows:

$I_1$ to $B_1$ when $SR_{11}$=0 and $SR_{12}$=0
$I_1$ to $B_2$ when $SR_{11}$=0 and $SR_{12}$=1
$I_1$ to $B_3$ when $SR_{11}$=1 and $SR_{12}$=1
$I_2$ to $B_2$ when $SR_{21}$=0 and $SR_{22}$=0
$I_2$ to $B_3$ when $SR_{21}$=0 and $SR_{22}$=1
$I_2$ to $B_4$ when $SR_{21}$=1 and $SR_{22}$=1
$I_3$ to $B_3$ when $SR_{31}$=0 and $SR_{32}$=0
$I_3$ to $B_4$ when $SR_{31}$=0 and $SR_{32}$=1
$I_3$ to $B_5$ when $SR_{31}$=1 and $SR_{32}$=1

As indicate above, fan-out is permitted only from the source lines $I_1 - I_3$ which fan out to the AND circuits $P_0 - T_2$, and from the flip-flops of the status register which fan out to the MAJORITY circuits, such as 118, 120 and 122. Failures in the AND circuits $P_0$ – $T_2$ (FIG. 7) are indistinguishable from failures in lines $B_1$ – $B_5$. Thus, a failure in an AND circuit cannot cause a failure of the switching circuit. In fact, it is impossible for any single logic block failure to prevent a good connection from being made. The worst that can happen is for one of the receiving units to fail (in this case, a buss line). While triple modular redundancy has been illustrated for introducing redundancy and failure tolerance into the status registers, it is apparent that this could be accomplished by other conventional means.

Figure 3:
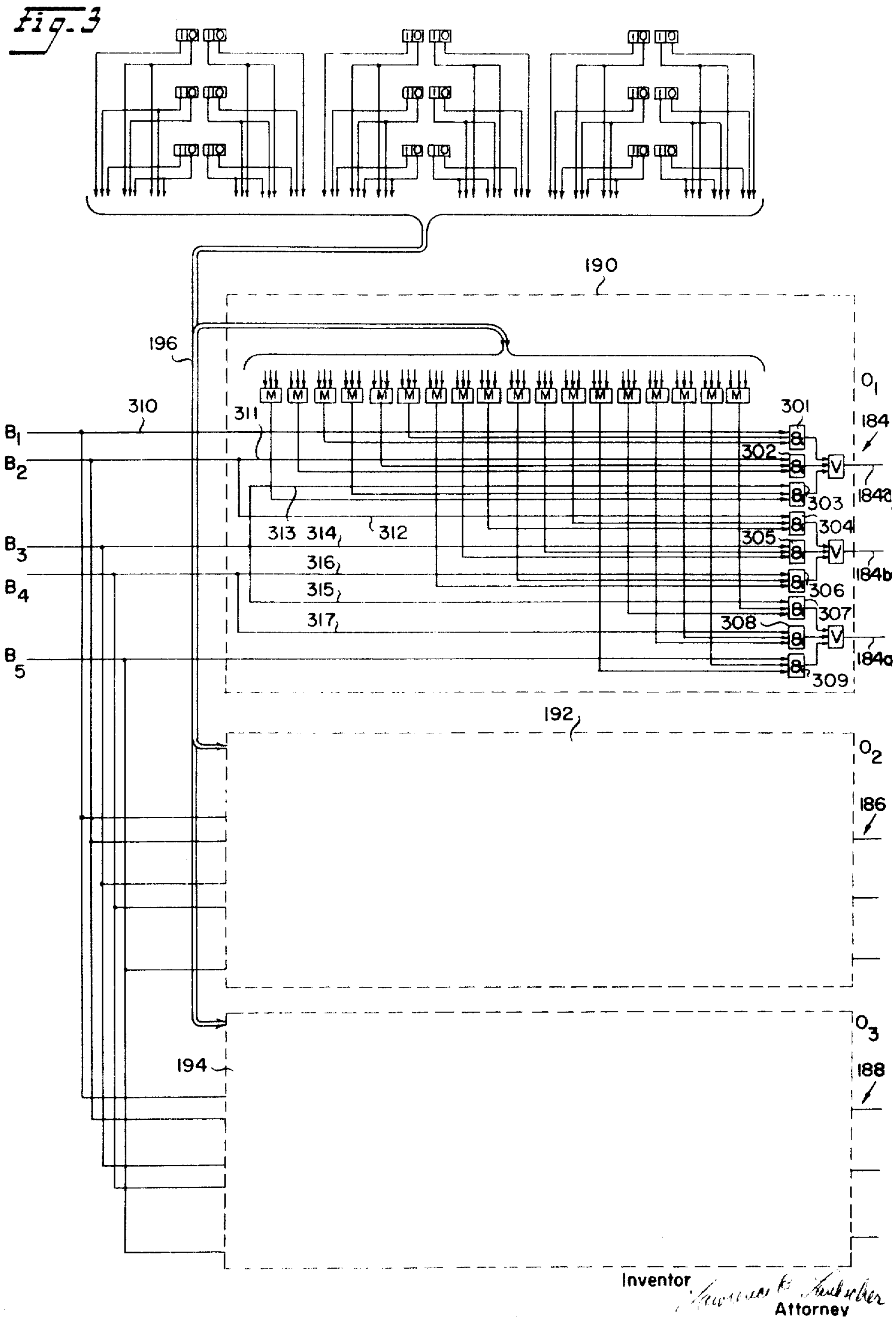
FIG. 3 illustrates schematically another inventive embodiment wherein the switching arrangement is of the bus-to-mo!dule type.

Referring now to the buss-to-module embodiment of FIG. 3, the five input lines $B_1 - B_5$ are connected with three groups of output lines 184, 186 and 188 via separate selection means 190, 192 and 194, respectively, whereby three good input lines of the group $B_1 - B_5$ are selectively routed to the three groups of output lines by the diagnostic program controlled status register means. Referring to the selection means 190, each output line of the group of lines 184 has associated therewith selection means comprising a tree circuit including three AND circuits feeding an OR circuit. The input line $B_1$ is connected via connection 310 with AND circuit 301 associated with the first line 184*a* of output group 184. Input line $B_2$ includes fan-out lines 311 and 312 connected with AND circuits 302 and 304 associated with lines 184*a* and 184*b*, respectively. Similarly, input line $B_3$ includes fan-out connections 313, 314, 315 with the AND circuits 303, 305 and 307, associated with lines 184*a*184*b* and 184*c*, respectively, and line $B_4$ includes fan-out connections 316 and 317 with the AND circuits 306 and 308 associated with lines 184*b* and 184*c*. Line $B_5$ is connected with output line 184*c* via AND circuit 309.

It is apparent from the above that separate selection devices are associated with each of the output line sets 184, 186, 188 and that fan-out is permitted only at the source. Furthermore, by appropriate switching control from the status register via cable 196 and the MAJORITY circuits M, information on three of the lines from $B_1$, $B_2$, $B_3$, $B_4$ and $B_5$ may be passed on to the three output lines in each receiving module.

The states of the registers control the selection of the lines $B_1 - B_5$ as follows:

$B_1$ to 184*a* when $SR_{11}$=0 and $SR_{12}$=0
$B_2$ to 184*a* when $SR_{11}$=0 and $SR_{12}$=1
184*b* when $SR_{21}$=0 and $SR_{22}$=0
$B_3$ 184*a* when $SR_{11}$=1 and $SR_{12}$=1
184*b* when $SR_{21}$=0 and $SR_{22}$=1
184*c* when $SR_{31}$=0 and $SR_{32}$=0
$B_4$ 184*b* when $SR_{21}$=0 when $SR_{22}$=1
184*c* when $SR_{31}$=0 and $SR_{32}$=1
$B_5$ 184*c* when $SR_{31}$=1 and $SR_{32}$=1

The same equipment illustrated in rectangle 190 is provided in rectangles 192 and 194. It is possible, if desired, to conserve some MAJORITY circuits by fanning out from them, but this must occur only with a single receiving module (i.e., with module 190). This does not violate the fan-out rules since a failure in such a majority circuit can still only disable one receiving module, i.e., module 190.

Figure 4:
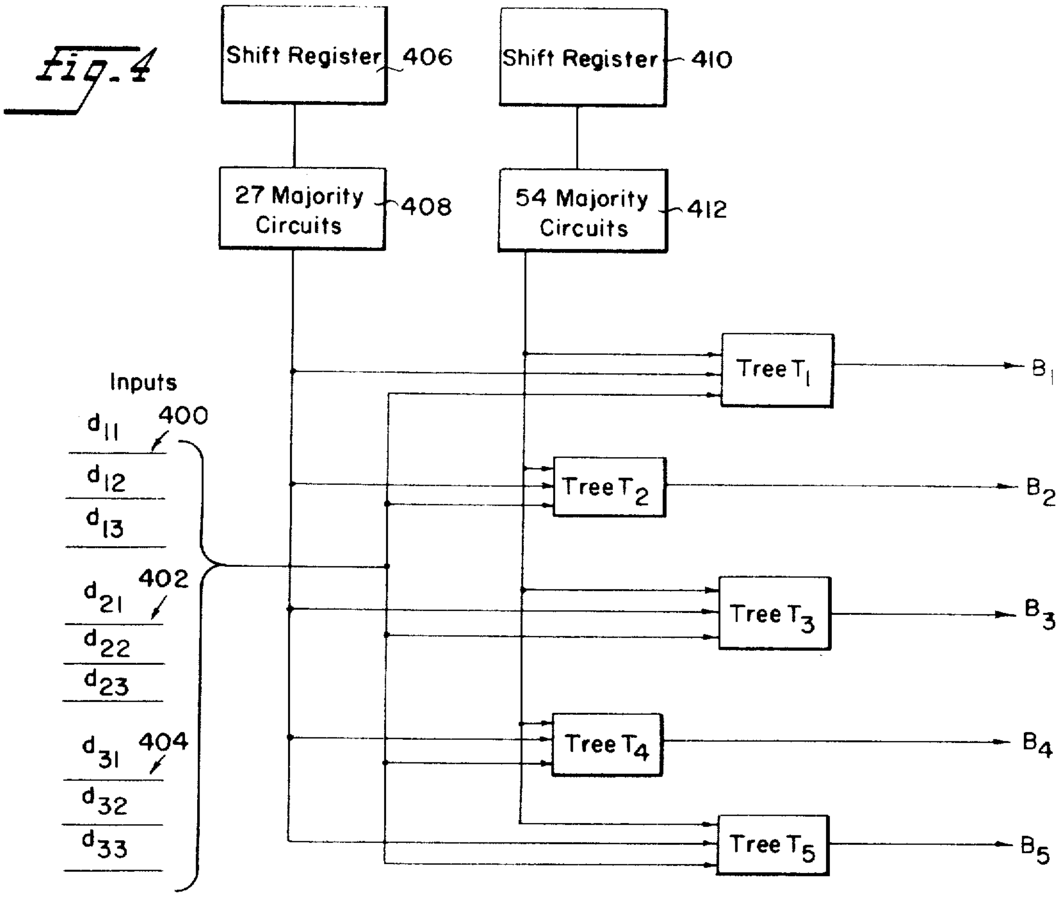
FIG. 4 is a block diagram of another embodiment of the invention wherein the switching arrangement is of the compound module-to-buss type.
Figure 5:
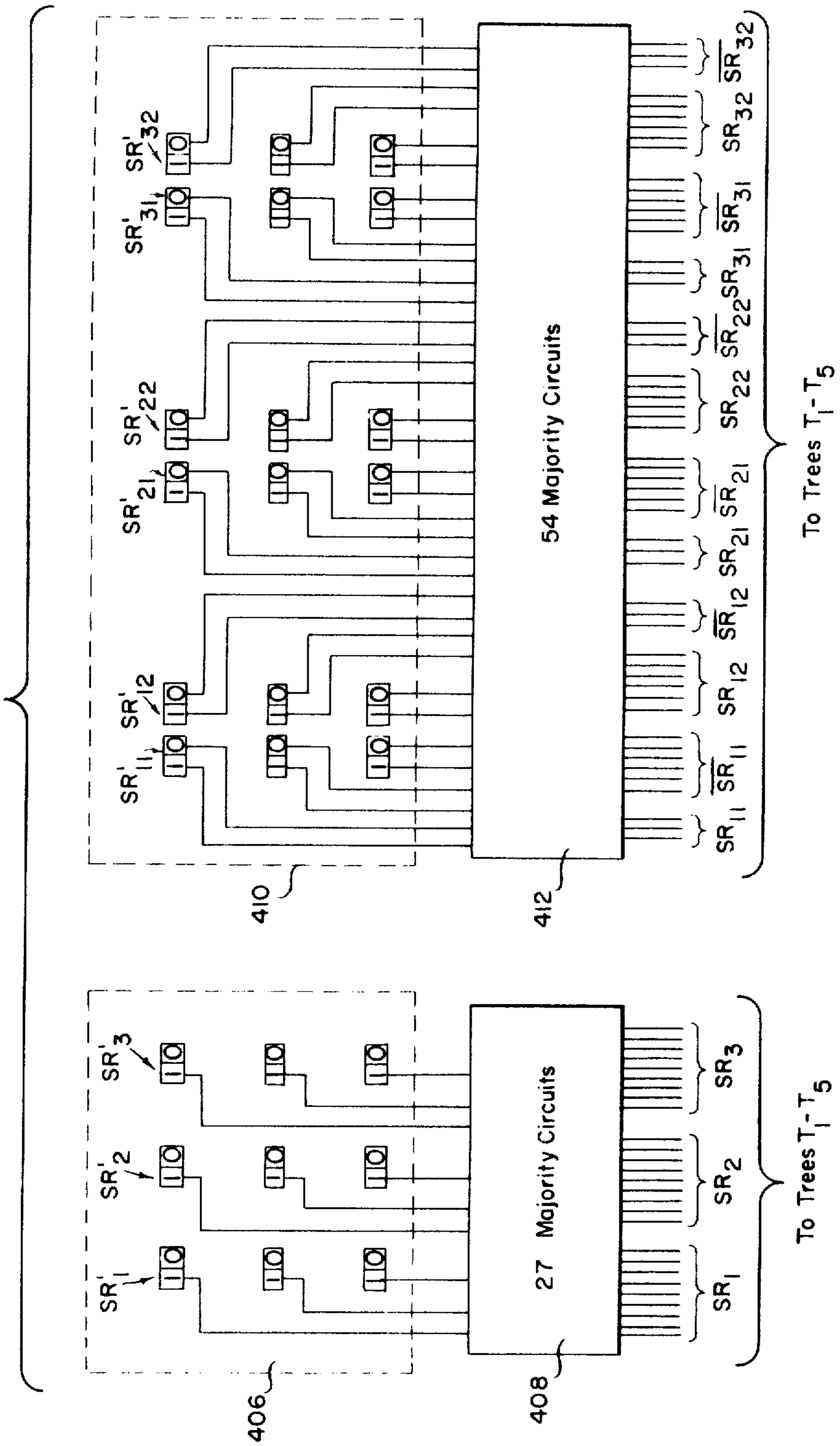
FIG. 5 is a detailed schematic diagram of the register means of FIG. 4.
Figure 6:
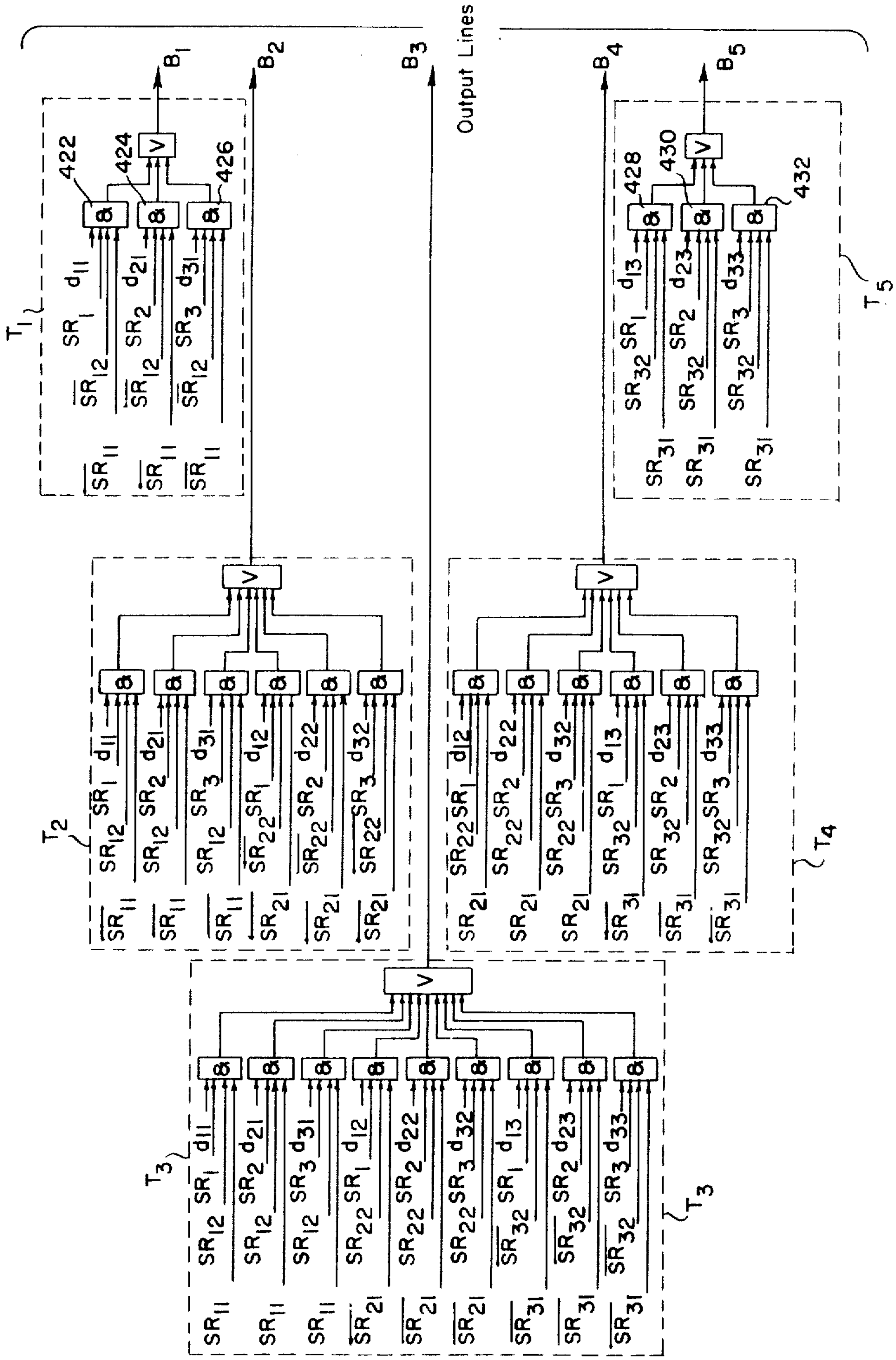
FIG. 6 is a detailed schematic of the tree selection means of FIG. 5.

Referring now to the compound module-to buss embodiment of the invention illustrated in FIGS. 4–6, three groups of input lines 400, 402 and 404 are adapted for selective connection with three of the five output lines $B_1$ – $B_5$ via selection means comprising tree circuits $T_1$ – $T_5$. First shift register means 406 are connected with the tree circuits $T_1 - T_5$ via 27 MAJORITY circuits 408 for selecting a given one of the input groups 400, 402 and 404. A diagnostic program controlled second shift register 410 is connected with the tree circuits $T_1 - T_5$ via 54 MAJORITY circuits said said register being used to connect the selected set of lines to three of the output lines $B_1 - B_5$.

As shown in FIG. 5, the first shift register includes three stages $SR_2'$ and $SR_3'$ of the triple modular redundancy encoded type connected with 27 MAJORITY circuits 408 having three groups of none output lines $SR_1$, $SR_2$ and $SR_3$ connected with the trees $T_1$ – $T_5$. The first register may be controlled by any suitable means, such as an error code program, diagnostic program means or the like. The second shift register includes six stages $SR_{11}'$, $SR_{12}'$, $SR_{21}'$, $SR_{22}'$, $SR_{31}'$ and $SR_{32}'$ also of the triple modular redundancy type connected with 54 MAJORITY circuits having groups of outputs $SR_{11}$, $\overline{SR_{11}}$, $SR_{12}$, $\overline{SR_{12}}$, $SR_{21}$, $\overline{SR_{21}}$, $SR_{22}$, $\overline{SR_{22}}$, $SR_{31}$, $\overline{SR_{31}}$, $SR_{32}$ and $\overline{SR_{32}}$.

Referring to FIG. 6, the connecting of the input and enabling lines to the AND circuits of each tree are shown, said AND circuits feeding OR circuits the outputs of which define the output lines $B_1 - B_5$.

As indicated above, in the embodiment of FIGS. 4–6, any one of three groups 400, 402, 404 of three lines each can be selected and this selected group of lines may be switched to any three of five output lines $B_1 - B_5$. The status register 410 is set according to the conditions (good or bad) of the output lines $B_1$ – $B_5$, and the shift register 406 is set to select the proper group of input lines. If the shift register is set to 100, the group of input lines 400 is selected, and for shift register settings of 010 and 001, the input line groups 402 and 404, respectively, are selected.

The $SR_{11}$ and $SR_{12}$ inputs to the AND circuits 422, 424 and 426 can be eliminated if desired, because it is not necessary to remove a signal from the $B_1$ line. If the $B_1$ line is good, the signal can be used. If the $B_1$ line is not good it is switched out or ignored where the B data is used. These AND circuits would then be two input AND's. The same holds true for the AND circuits 428, 430 and 432 of tree $T_5$, except that in this case, the inputs that can be eliminated are $SR_{31}$ and $SR_{32}$.

A saving in MAJORITY circuits can be made by fanning out from the MAJORITY circuits of either group (408 or 412), providing that fan-out can occur only within a single logic tree driving one of the B output lines, and never between logic trees driving two different B outputs. By following this rule, a single MAJORITY circuit can, in the worst case, bring down only one buss line and not disable the switching circuit. The net result of such limited MAJORITY fan-out is that the circuitry is reduced with negligible effect on reliability.

Figure 7:
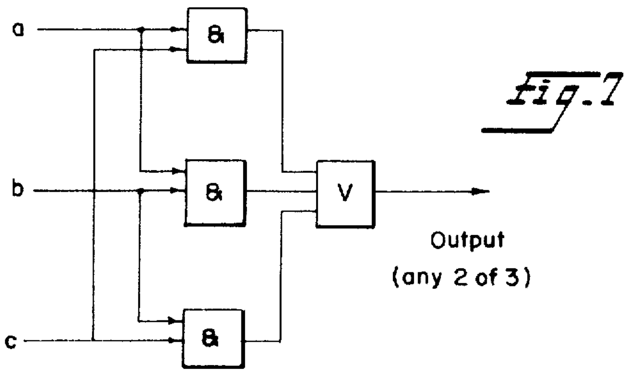
FIG. 7 is a detailed logic diagram of one of the MAJORITY circuits of FIG. 4.

The detailed logic for a MAJORITY circuit is shown in FIG. 7 wherein the three inputs *a*, *b* and *c* carry identical information and, if functioning properly, will all be active at the same time. It can be seen that a single failure of one of the input lines will not affect the output. Majority gates are used to decode and correct the shift register contents for the triple modular redundancy code. Other codes would require different decoding circuits. While specific numbers of receivers, senders, and input and output lines have been illustrated, the teaching is extendable to greater numbers. AND/OR logic has been shown, but it is apparent that other logic (for example, NAND — NAND logic) is equally applicable.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a computer system of the stand-by redundancy type, switching means adapted to remove the effect of a failed component means, comprising a plurality of input data lines;

a plurality of output data lines;

a plurality of selection means the number of which is at least as great as the number of said output lines, said selection means having output sides functionally connected with said output lines, respectively;

means connecting the input data lines with the input sides of said selection means, respectively, said connecting means including at least one fan-out conductor arrangement connecting one input line with at least two selection means;

and control means controlling the operation of said selection means to define a first system configuration wherein certain input lines are connected with certain output lines, said control means being operable, upon failure of a said selection means to effect system reconfiguration using a different selection means, by-passing the failed selection means, to form a new connection between input lines and output lines without disabling the complete switching system.

2. Switching means as defined in claim 1, wherein the system is of the module-to-module type in which said plurality of input data lines comprises a plurality of groups of lines and said plurality of output data lines comprises a plurality of groups of lines and wherein said control means is operable to connect with all of said plurality of groups of said output data lines any selected one of said plurality of groups of input data lines.

3. Switching means as defined in claim 2, wherein said selection means comprises groups of normally disabled gates associated with each group of output lines, respectively, the number of gates in each group thereof being equal to the number of groups of input lines.

4. Switching means as defined in claim 3, wherein said fan-out conductor means connects each group of input lines with a given gate of each gate group, respectively.

5. Switching means as defined in claim 1, wherein the system is of the single module-to-buss type, wherein the number of output lines is greater than the number of input lines, and further wherein said fan-out conductor means connects at least one input line with a plurality of said selection means.

6. Switching means as defined in claim 5, wherein said control means is operable to so reconfigure the system as to shift a plurality of input lines around said failed selection means during the replacement thereof.

7. A switching system as defined in claim 5, wherein said control means includes register means containing at least one bistable device having a pair of outputs, and further including a plurality of majority circuit means each having an output connected with one of said selection means, respectively, conductor means connecting one bistable device output with the input of one majority circuit means, and fan-out conductor means connecting the other bistable device output with a plurality of said majority circuit means.

8. Switching means as defined in claim 5, wherein at least one selection means associated with one output line comprises a tree arrangement including a plurality of AND circuits feeding a single OR circuit.

9. Switching means as defined in claim 8, wherein at least one other selection means associated with another output line comprises solely an AND circuit.

10. Switching means as defined in claim 1, wherein the system is of the buss-to-module type, wherein the number of input lines exceeds the number of output lines from a module.

11. Switching means as defined in claim 10, wherein at least one of said switching means comprises a tree arrangement including a plurality of AND circuits feeding an OR circuit.

12. Switching means as defined in claim 1, wherein the system is of the compound module-to-buss type, in which said plurality of input data lines comprise a plurality of groups of lines wherein the number of output lines is greater than the number of lines in a said group of input lines, and further wherein said control means includes a first register for enabling a selected one of said input line groups for connection with said output lines, and a second register for enabling a selected group of output lines equal in number to the number of lines in the selected input line group for connection with said selected input line group.

13. Switching means as defined in claim 1, wherein said control means comprises shift register means of the triple modular redundancy type each stage of which includes three flip-flops.

14. In a computer system of the stand-by redundancy type, switching means adapted to remove the effect of a failed component means, comprising a plurality of input data lines;

a plurality of output data lines differing in number from said input data lines;

a plurality of selection means the number of which is at least as great as the number of said output lines, said selection means having output sides functionally connected with said output lines, respectively;

means connecting the input data lines with the input sides of said selection means, respectively, said connecting means including at least one fan-out conductor arrangement connecting one input line with at least two selection means;

and control means controlling the operation of said selection means to define a first system configuration wherein certain input lines are connected with certain output lines, said control means being operable, upon failure of a said selection means, to effect system reconfiguration using a different selection means, by-passing the failed means, to maintain connection between the plurality of data lines having the lesser number and an equal number of data lines of the other said plurality of data lines.

* * * * *